(12) United States Patent
Tobari et al.

(10) Patent No.: US 7,148,651 B2
(45) Date of Patent: Dec. 12, 2006

(54) APPARATUS AND METHOD FOR CONTROLLING AC MOTOR AND MODULE THEREFOR

(75) Inventors: Kazuaki Tobari, Hitachiota (JP); Tsunehiro Endo, Hitachiota (JP); Hidefumi Shirahama, Hitachi (JP); Yoshiki Itou, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/893,269

(22) Filed: Jul. 19, 2004

(65) Prior Publication Data

US 2005/0017671 A1   Jan. 27, 2005

(30) Foreign Application Priority Data

Jul. 22, 2003  (JP) .............................. 2003-199570

(51) Int. Cl.
   *H02P 27/04* (2006.01)
(52) U.S. Cl. ...................... 318/802; 318/811; 318/700; 318/807; 318/723
(58) Field of Classification Search ................ 318/807, 318/599, 811, 727
   See application file for complete search history.

(56) References Cited

U.S. PATENT DOCUMENTS

| | | | | |
|---|---|---|---|---|
| 3,662,247 A | * | 5/1972 | Schieman ..................... | 363/41 |
| 4,179,727 A | * | 12/1979 | Muto et al. .................... | 363/41 |
| 4,409,535 A | * | 10/1983 | Hickman ...................... | 318/811 |
| 4,458,194 A | * | 7/1984 | Geppert et al. ............. | 318/811 |
| 4,629,959 A | * | 12/1986 | Okuyama et al. ............ | 318/727 |
| 4,673,859 A | * | 6/1987 | Shero et al. ................. | 318/810 |
| 4,905,435 A | * | 3/1990 | Horst ........................... | 52/235 |
| 5,068,777 A | * | 11/1991 | Ito ................................ | 363/97 |
| 5,072,354 A | * | 12/1991 | Katto et al. ................... | 363/41 |
| 5,361,196 A | * | 11/1994 | Tanamachi et al. .......... | 363/41 |
| 5,623,219 A | * | 4/1997 | Karraker ...................... | 327/50 |
| 5,805,438 A | * | 9/1998 | Takada et al. ................ | 363/98 |
| 6,512,343 B1 | * | 1/2003 | Yasohara ..................... | 318/437 |
| 6,617,821 B1 | * | 9/2003 | Kerkman et al. ........... | 318/801 |
| 6,873,125 B1 | * | 3/2005 | Seima et al. ................ | 318/254 |
| 2004/0000888 A1 | * | 1/2004 | Shimada et al. ........... | 318/432 |

FOREIGN PATENT DOCUMENTS

| | | | | |
|---|---|---|---|---|
| JP | 05184182 | A | * | 7/1993 |
| JP | 06165307 | A | * | 6/1994 |
| JP | 80-19263 | | | 1/1996 |
| JP | 2004064903 | A | * | 2/2004 |

* cited by examiner

*Primary Examiner*—Lincoln Donovan
*Assistant Examiner*—Renata McCloud
(74) *Attorney, Agent, or Firm*—McDermott Will & Emery LLP

(57) ABSTRACT

A method and apparatus for controlling a permanent magnet synchronous motor by accurately detecting 3-phase motor currents from a DC input current in a full voltage range are provided. In the motor control apparatus for detecting the 3-phase motor currents on the basis of the value of the current detected at a DC side of a PWM inverter, when a difference width between PWM pulse signals of two of three phases of the 3-phase PWM inverter which cannot detect the motor currents is not larger than a predetermined value or when the output voltage of the 3-phase PWM inverter is low, the apparatus automatically reduce the carrier frequency of the PWM inverter.

6 Claims, 9 Drawing Sheets

US 7,148,651 B2

APPARATUS AND METHOD FOR CONTROLLING AC MOTOR AND MODULE THEREFOR

BACKGROUND OF THE INVENTION

This invention relates to an apparatus and method for controlling an A.C. motor and also to a module therefor.

As a related art technique for detecting 3-phase motor currents on the basis of a current value detected at a DC side, a control apparatus is disclosed in JP-A-8-19263.

The control apparatus is arranged to detect 3-phase motor currents at predetermined timing according to a PWM signal on the basis of the current value detected at a DC side of a PWM inverter.

SUMMARY OF THE INVENTION

In the case where 3-phase motor currents are detected at predetermined timing according to a PWM signal on the basis of a current value detected at a DC side of a PWM inverter, when the levels of voltages corresponding to 2 phases of the IWM inverter are close to each other or when the level of an output voltage thereof is low, it becomes difficult to detect the currents.

It is therefore an object of this invention to provide an apparatus and method for controlling an AC motor by accurately detecting 3-phase motor currents on the basis of a DC input current and also to a module therefor.

In accordance with a feature of this invention, there is provided an apparatus for controlling an AC motor which estimates AC motor currents on the basis of a DC input current of a 3-phase PWM inverter which uses a DC current as its input to drive the AC motor. In the control apparatus, when a difference width in PWM pulse signal between at least two phases of the 3-phase PWM inverter is not larger than a predetermined value or when an output voltage thereof is low, a carrier frequency of the 3-phase PWM inverter is reduced.

Other objects, features and advantages of this invention will become apparent from the following description of the embodiments of this invention taken in conjunction with the accompanying drawings.

DESCRIPTION OF THE EMBODIMENTS

Embodiments of this invention will be explained in detail with reference to accompanying drawings.

<First Embodiment>

Figure 1:
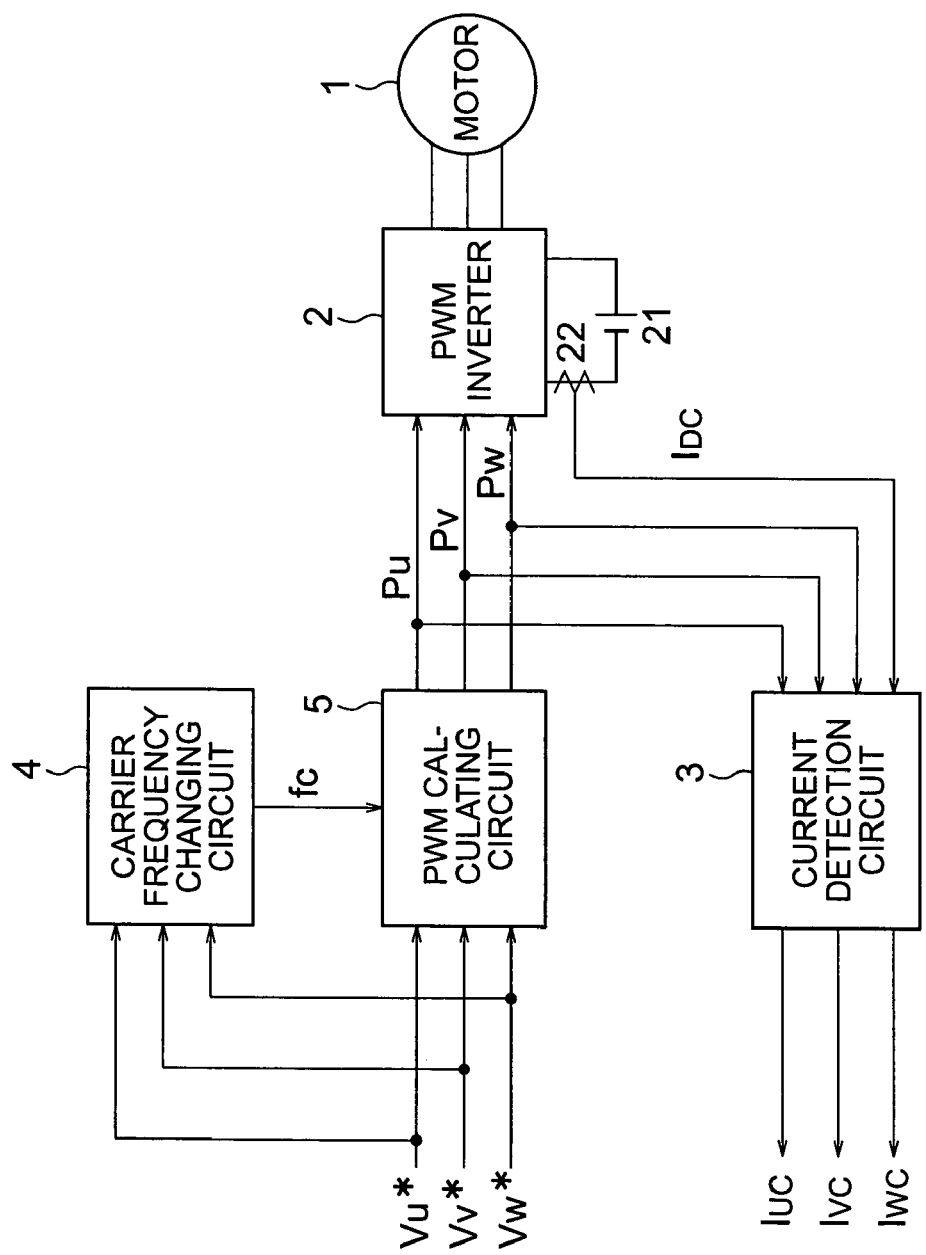
FIG. 1 shows an arrangement of an apparatus for controlling a permanent magnet synchronous motor in accordance with an embodiment of this invention.

FIG. 1 shows an exemplary arrangement of an apparatus for controlling a permanent magnet synchronous motor in accordance with an embodiment of this invention. In the drawings, reference numeral 1 denotes a permanent magnet synchronous motor, numeral 21 denotes a DC power source; 22 denotes a shunt resistance; 2 denotes a PWM inverter for outputting output voltages in proportion to voltage command values Vu*, Vv* and Vw* of 3-phase AC currents; 3 denotes a current detection circuit for detecting 3-phase AC motor currents Iuc, Ivc and Iwc from PWM pulse signals Pu, Pv and Pw and a DC input current $I_{DC}$; 4 denotes a carrier frequency changing circuit for deciding a carrier frequency fc on the basis of the voltage command values Vu*, Vv* and Vw*; and 5 denotes a PWM calculating circuit for outputting PWM pulse signals Pu, Pv and Pw which controllably turn on and off switching elements of the PWM inverter 2 according to the voltage command values Vu*, Vv* and Vw* and the carrier frequency fc.

Description will first be made as to the basic operation of the current detection circuit 3 for detecting 3-phase AC motor currents according to the DC input current $I_{DC}$.

Figure 2:
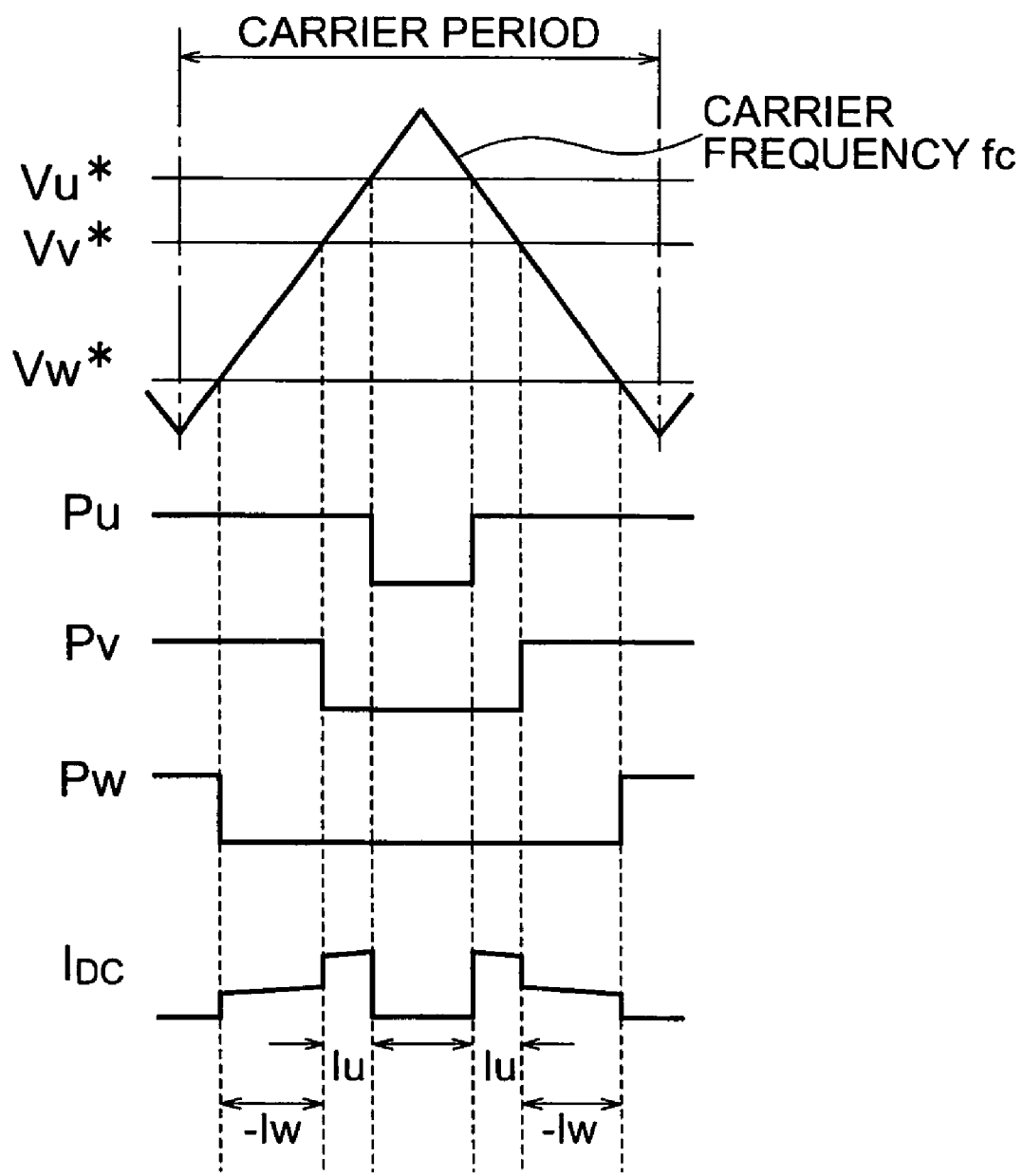
FIG. 2 is a timing chart for explaining the operation of a current detection circuit 3 in the embodiment of FIG. 1.

FIG. 2 shows a relationship among the voltage command values Vu*, Vv* and Vw*, the carrier frequency fc, the PWM pulse signals Pu, Pv and Pw, and the DC input current $I_{DC}$ flowing through the shunt resistance 22 of the PWM inverter 2. Two-phase current information −Iw and Iu as minimum and maximum phase Vw* and Vu* of the voltage command values appear twice during a PWM carrier period of the DC input current $I_{DC}$. The current detection circuit 3 samples the DC input current $I_{DC}$ from the current information of the DC input current $I_{DC}$ on the basis of the PWM pulse signals Pu, Pv and Pw, distributes the sampled currents to the respective phases, and detects the 3-phase current detection values Iuc, Ivc and Iwc.

Description will then be made as to contents associated with this invention. More specifically, description is directed to a phenomenon in which current detection becomes impossible when the intermediate phase of the voltage command values is close to the minimum phase or when the level of the output voltage is low. In this connection, the expression of "when the level of the output voltage is low" as used herein means when the output voltage is not larger than several percent of a rated voltage (0 to 10 percent and desirably 0 to 4 percent thereof).

Figure 3:
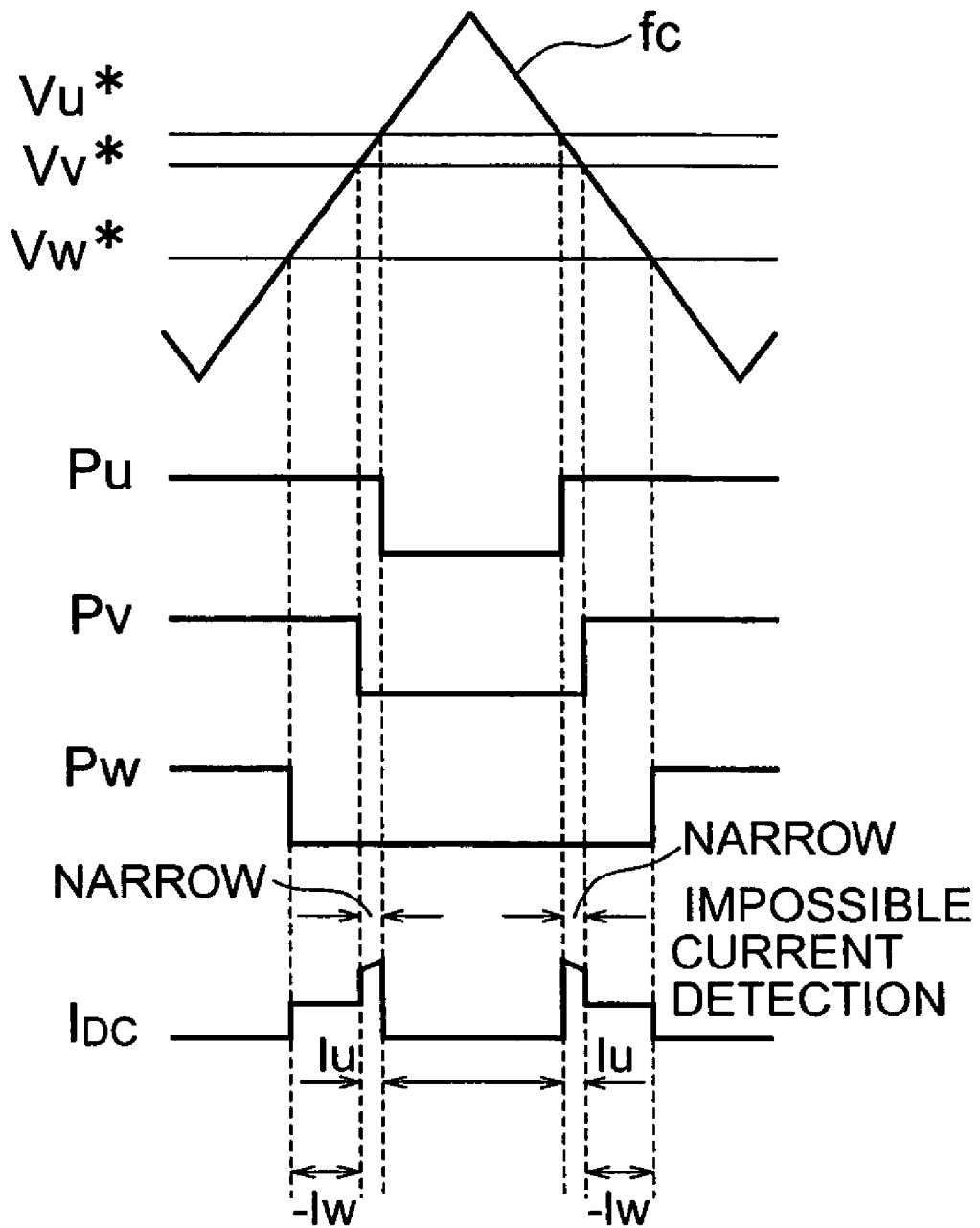
FIG. 3 is a timing chart for explaining the operation of the current detection circuit 3 when current detection becomes impossible.

FIG. 3 shows a relationship between the PWM pulse signals Pu, Pv and Pw and the DC input current $I_{DC}$ when the intermediate phase Vv* of the voltage command values is close to the maximum phase Vu*. When the voltage levels of two of three phases are close to each other, it is understood that the pulse width of the DC input current $I_{DC}$, during which the Iu information, appears becomes narrow. In this case, a current detection minimum time Tpwm_min necessary for detecting the current information Iu from the DC input current $I_{DC}$ is expressed as follows.

$$Tpwm\_min = Td + Trig + Tsmpl + Tpow\_on - Tpow\_off \quad (1)$$

where,
Td: dead time,
Trig: current rigging time upon turn on and off,
Tsmpl: A/D converter sampling time,
Tpow_on: power element on delay time,
Tpow_off: power element off delay time.

That is, when a difference width between the PWM pulse signals Pu and Pv is shorter than the current detection minimum time Tpwm_min, the current detection becomes impossible. This means that the current detection from the DC input current becomes impossible before and after the central phase at which the two-phase voltage command values become equal to each other.

To avoid this, in this embodiment, the carrier frequency changing circuit 4 in FIG. 1 is arranged to automatically change the carrier frequency in such a manner that a difference between a pulse width of PWM pulse signals having the intermediate phase and that of the PWM pulse signals having a minimum phase is made larger than the value of the current detection minimum time. After changed, the carrier frequency fc becomes as follows:

$$fc \leq \frac{T_{pwm\_typ}}{T_{pwm\_min}} fc\_typ \qquad (2)$$

where,
fc: carrier frequency after changed,
fc_typ: normal carrier frequency,
Tpwm_typ: time duration of the PWM pulse difference width at fc_typ.

Figure 4:
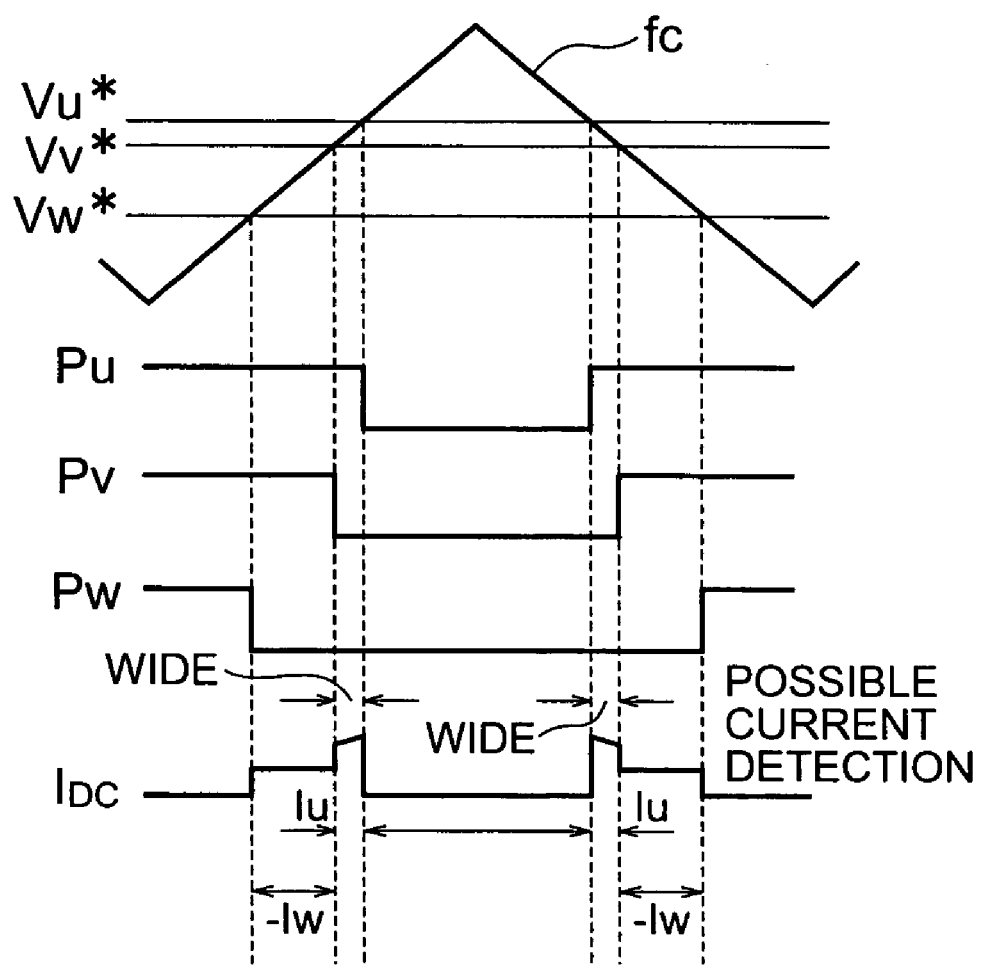
FIG. 4 is a timing chart for explaining the operation of this invention when a carrier frequency is automatically adjusted.

As a result, when the difference width between the PWM pulse signals Pu and Pv is made wide as shown in FIG. 4, the Iu current detection can be possible.

<Second Embodiment>

Figure 5:
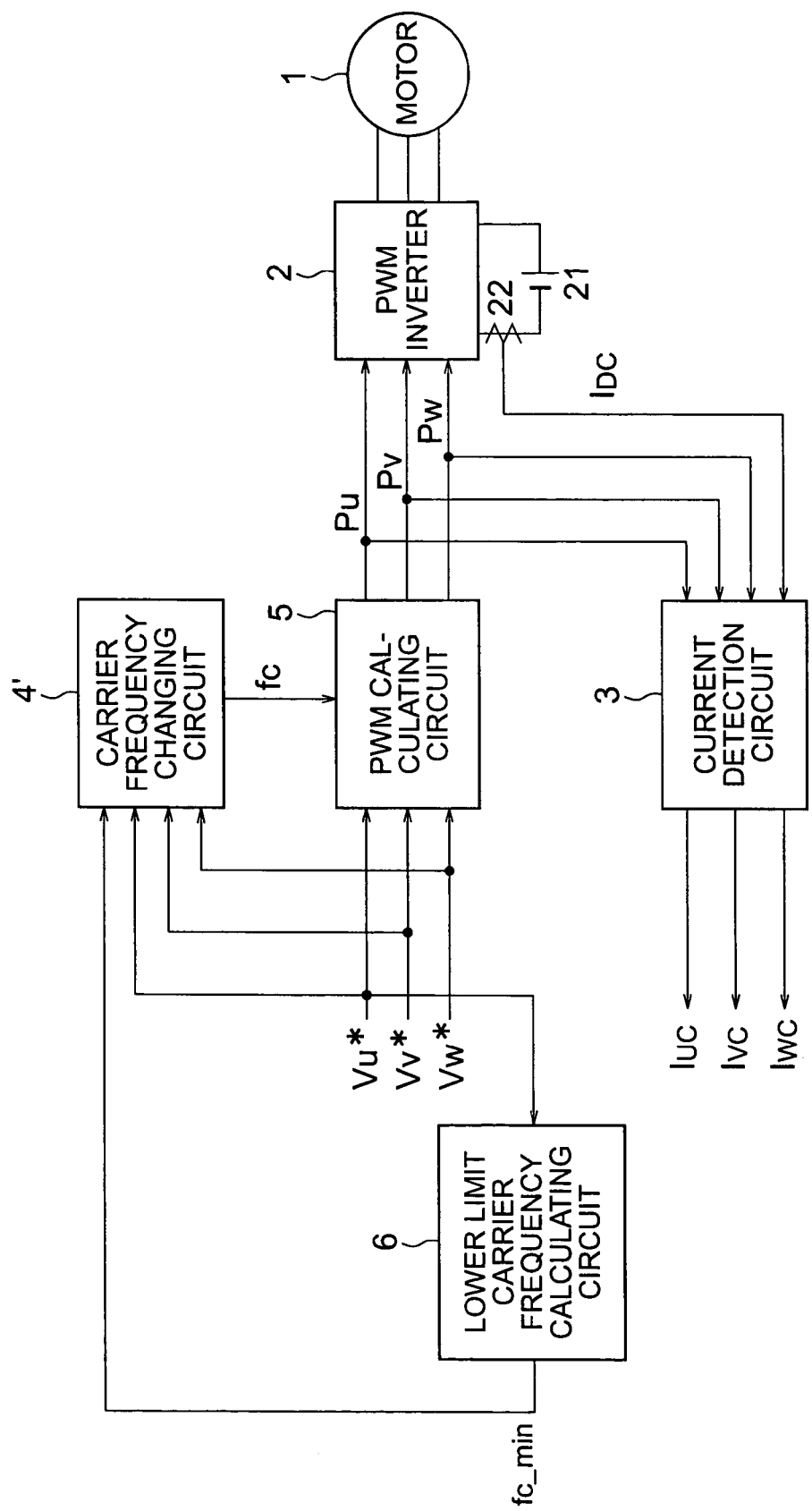
FIG. 5 is an arrangement of an apparatus for controlling a permanent magnet synchronous motor in accordance with another embodiment of this invention for explaining a current detection ratio.

FIG. 5 shows another embodiment of this invention. This embodiment is directed to an apparatus for controlling a permanent magnet synchronous motor by making constant a current detection ratio between the motor currents to thereby automatically set a lower limit value of the carrier frequency.

In the first embodiment, the carrier frequency fc is lowered to make the difference width between the PWM pulse signals larger than the current detection minimum time, thus enabling the current detection. This embodiment, on the other hand, has features (1) to (3) which follow.
(1) The current detection is synchronized with the period of the carrier, so that the lower the carrier frequency is the longer the period of the current detection is, whereby the response of a current control system is not limited thereby.
(2) When the carrier frequency is lowered, an average carrier frequency also decreases, whereby electromagnetic sound is prevented from becoming large.
(3) Current ripple is prevented from becoming large.

To this end, this embodiment is arranged to set the lower limit value of the carrier frequency according to a voltage modulation ratio in such a manner that the current detection ratio between the motor current has a predetermined value.

In FIG. 5, the same reference numerals as in FIG. 1 such as 1 to 3, 5, 21 and 22 designate the same constituent elements.

FIG. 5 is different from FIG. 1 in that the lower limit value of the carrier frequency fc as the output of a carrier frequency changing circuit 4' on the basis of a lower limit value fc_min of the carrier frequency fc as the output signal of a lower-limit carrier frequency calculating circuit 6.

The carrier frequency changing circuit 4' outputs the carrier frequency fc having a lower limit value fc_min or fc_typ as shown below.

When fc_typ ≧ fc_min, the fc has a lower limit value fc_min.

When fc_typ < fc_min, the fc has a lower limit value fc_typ.

Figure 6:
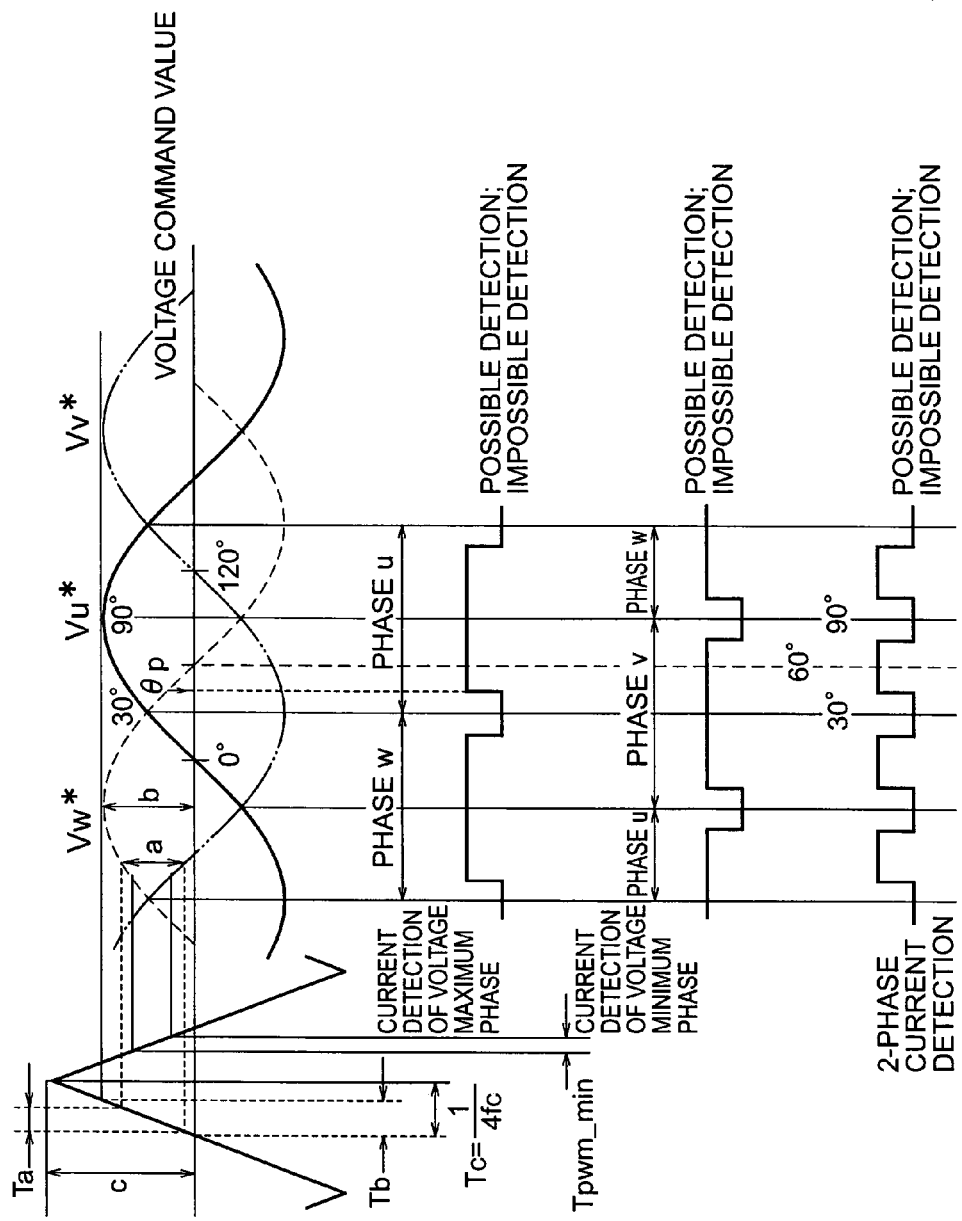
FIG. 6 exemplifies a relationship among a voltage command value, a carrier frequency and possible/impossible 2-phase current detection.

Description will next be made as to the current detection ratio between the motor currents. FIG. 6 shows an exemplary relationship among the voltage command values Vu*, Vv* and Vw*, the carrier frequency fc and possible/impossible 2-phase current detection.

In FIG. 6, it is assumed that a point, at which the voltage command value Vu* of phase u varies from negative to positive, indicates a reference point of 0 degree, and a phase at which the maximum phase of the voltage command value varies from 'impossible detection' to 'possible detection' is denoted by θp.

It is also assumed that reference symbol a denotes a voltage difference in voltage command value between the maximum and intermediate phases; symbol b denotes the peak value of the voltage command value; symbol c denotes the peak value of the PWM carrier frequency; Ta, Tb and Tc denote times in the PWM pulse signal with respect to the voltage magnitudes a, b and c respectively.

A duration for finding a current detection ratio is set to have an electrical angle of 60 degrees. In the illustrated example, consider a 60-degree duration from an electrical angle of 30 degrees to an electrical angle of 60 degrees.

In this duration, the phase u is the maximum phase of the voltage command value, the phase v is the minimum phase thereof, and the phase w is the intermediate phase thereof. A voltage difference a between the phases u and w is expressed by equation (3) which follows.

$$a = b\left(\sin\theta - \sin\left(\theta + \frac{2}{3}\pi\right)\right) \qquad (3)$$

where a relation of a:b=Ta:Tb is satisfied. Hence equation (3) is rewritten to equation (4).

$$Ta = Tb\left(\sin\theta - \sin\left(\theta + \frac{2}{3}\pi\right)\right) \qquad (4)$$

Next, a voltage modulation ratio kH is expressed as follows.

$$kH = \frac{b}{c} = \frac{Tb}{Tc} \qquad (5)$$

Since Tc is a time corresponding to ¼ of the carrier frequency, equation (5) is rewritten to equation (6) using the carrier frequency fc.

$$Tc = \frac{1}{4 \cdot fc} \qquad (6)$$

Solving equations (5) and (6) for Tb results in.

$$Tb = \frac{kH}{4 \cdot fc} \quad (7)$$

Using equations (4) and (7), equation (8) is obtained.

$$Ta = \frac{kH}{4 \cdot fc} \cdot \left(\sin\theta - \sin\left(\theta + \frac{2}{3}\pi\right)\right) \quad (8)$$

In equation (8), when $\theta = \theta p$, Ta=Tpwm_min. Substituting Ta into equation (8) yields the following equation (9).

$$\theta p = \frac{2}{3} \cdot \pi - \cos^{-1}\left(\frac{4}{\sqrt{3}} \cdot \frac{fc}{kH} \cdot Tpwm\_min\right) \quad (9)$$

where, $$\frac{\pi}{6} \leq \theta p \leq \frac{\pi}{3}$$

Assume now that a current detection ratio α is a ratio at which currents corresponding to 2 phases can be detected for a duration having a predetermined electrical angle of 60 degrees. Then the current detection ratio α can be obtained as a ratio of a 30-degree duration from 30 to 60 degrees with respect to a duration from θp to 60 degrees. Hence the current detection ratio α is expressed by equation (10).

$$\alpha = \frac{\left(\frac{\pi}{3} - \theta p\right)}{\frac{\pi}{6}} \quad (10)$$

The current detection ratio α is rewritten to equation (11), using equations (9) and (10)

$$\alpha = \frac{-\frac{\pi}{3} + \cos^{-1}\left(\frac{4}{\sqrt{3}} \cdot \frac{fc}{kH} \cdot Tpwm\_min\right)}{\frac{\pi}{6}} \quad (11)$$

When equation (11) is solved for the carrier frequency fc, the result is.

$$fc = \frac{\sqrt{3}}{4} \cdot \frac{kH}{Tpwm\_min} \cdot \cos\left(\frac{\pi}{6} \cdot (\alpha + 2)\right) \quad (12)$$

where, 0<α<1.

When the carrier frequency fc is now replaced with the lower limit value fc_min, the result is.

$$fc\_min = \frac{\sqrt{3}}{4} \cdot \frac{kH}{Tpwm\_min} \cdot \cos\left(\frac{\pi}{6} \cdot (\alpha + 2)\right) \quad (13)$$

Figure 7:
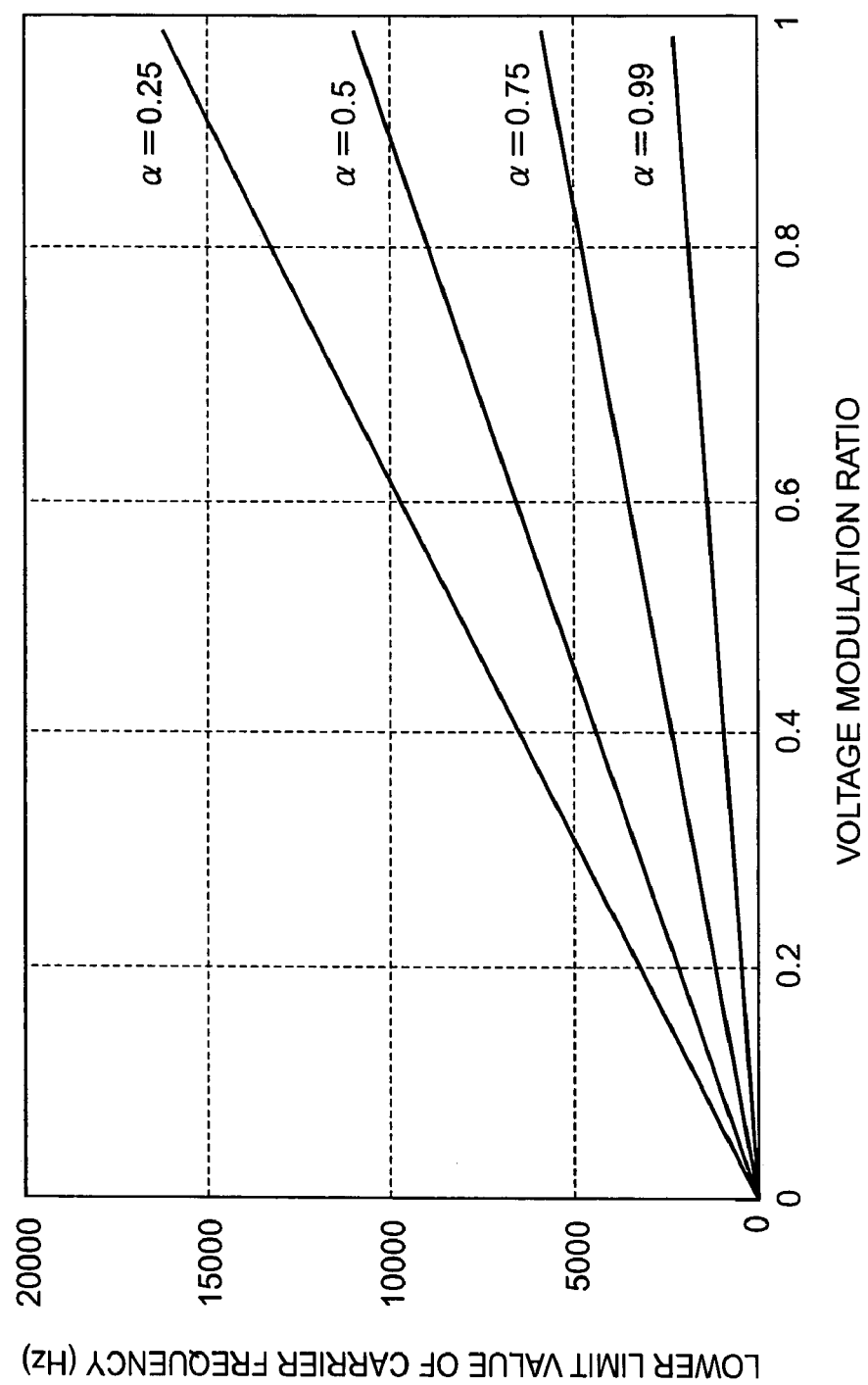
FIG. 7 exemplifies a relationship between a voltage modulation ratio and the lower limit value of the carrier frequency.

FIG. 7 shows a relationship between the voltage modulation ratio kH and the lower limit value fc_min of the carrier frequency, when Tpwm_min=10 μs and the current detection ratio α is changed (α=0.25, 0.5, 0.75 and 0.99) in equation (13). When the current detection ratio α (where 0<α<1) is set at an arbitrary current detection ratio α* and then substituted into equation (13), the lower limit value fc_min of the carrier frequency can be determined according to the voltage modulation ratio kH.

The present embodiment has advantages which follow. That is, the need of lowering the carrier frequency to a level below its necessary level can be eliminated. Since the current detection is synchronized with the carrier period, the lower the carrier frequency is the longer the period of the current detection is. Thus the response of the current control system cannot be limited. The lower the carrier frequency is the lower the average carrier frequency is. Consequently, the electromagnetic sound can be prevented from becoming large and the current ripple can be avoided from becoming large.

<Third Embodiment>

Figure 8:
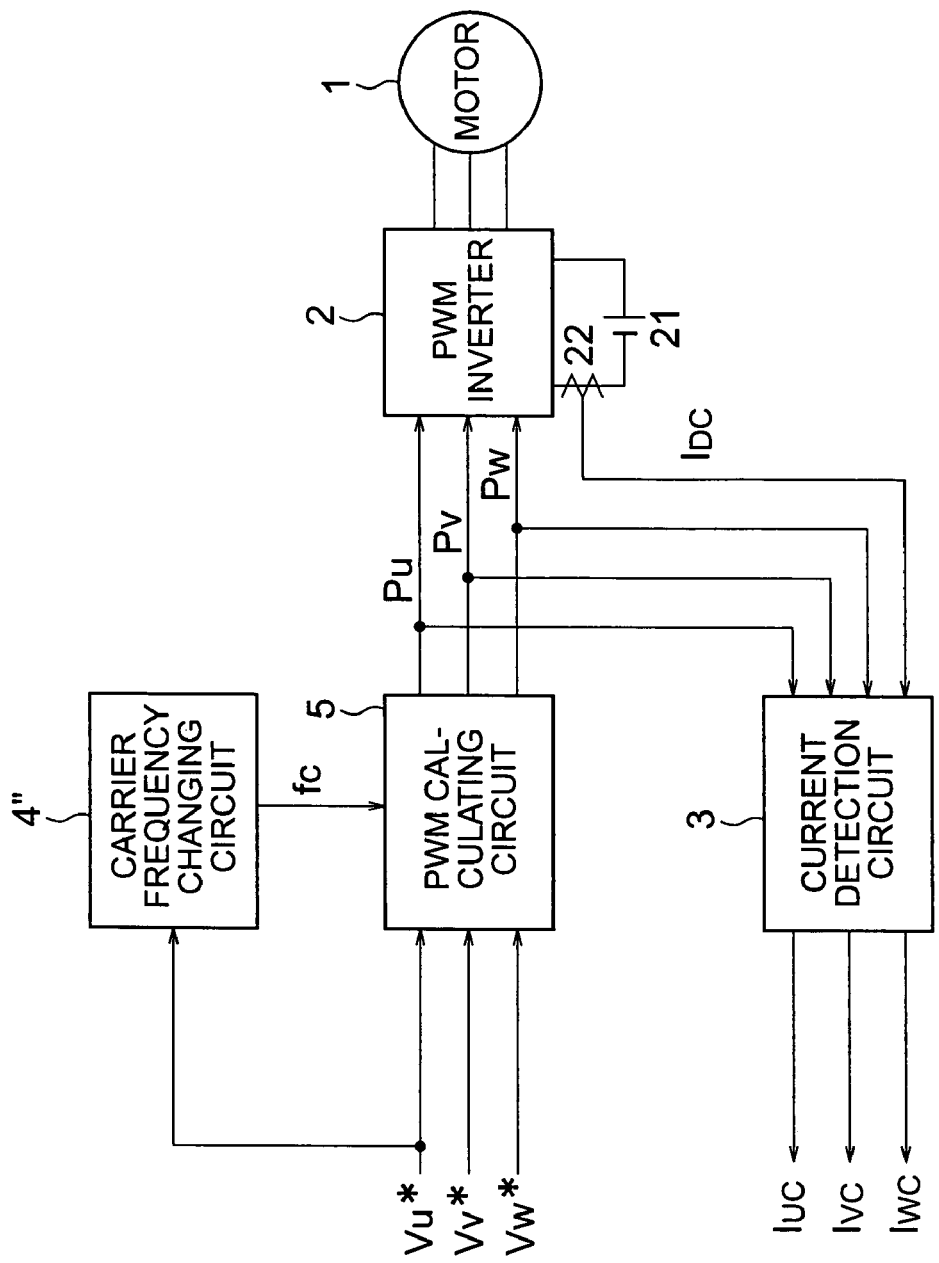
FIG. 8 is an arrangement of an apparatus for controlling a permanent magnet synchronous motor in accordance with a further embodiment of this invention.

FIG. 8 shows another embodiment of the present invention. The present embodiment is directed to an apparatus for controlling a permanent magnet synchronous motor by automatically changing the carrier frequency according to the current detection ratio between the motor currents.

A carrier frequency changing circuit 4″ decides the carrier frequency fc according to the voltage modulation ratio kH in such a manner that the current detection ratio α becomes constant. Even in this embodiment, the need of lowering the carrier frequency to a level below its necessary level can be avoided. Therefore, this embodiment can exhibit effects similar to the second embodiment.

<Fourth Embodiment>

Figure 9:
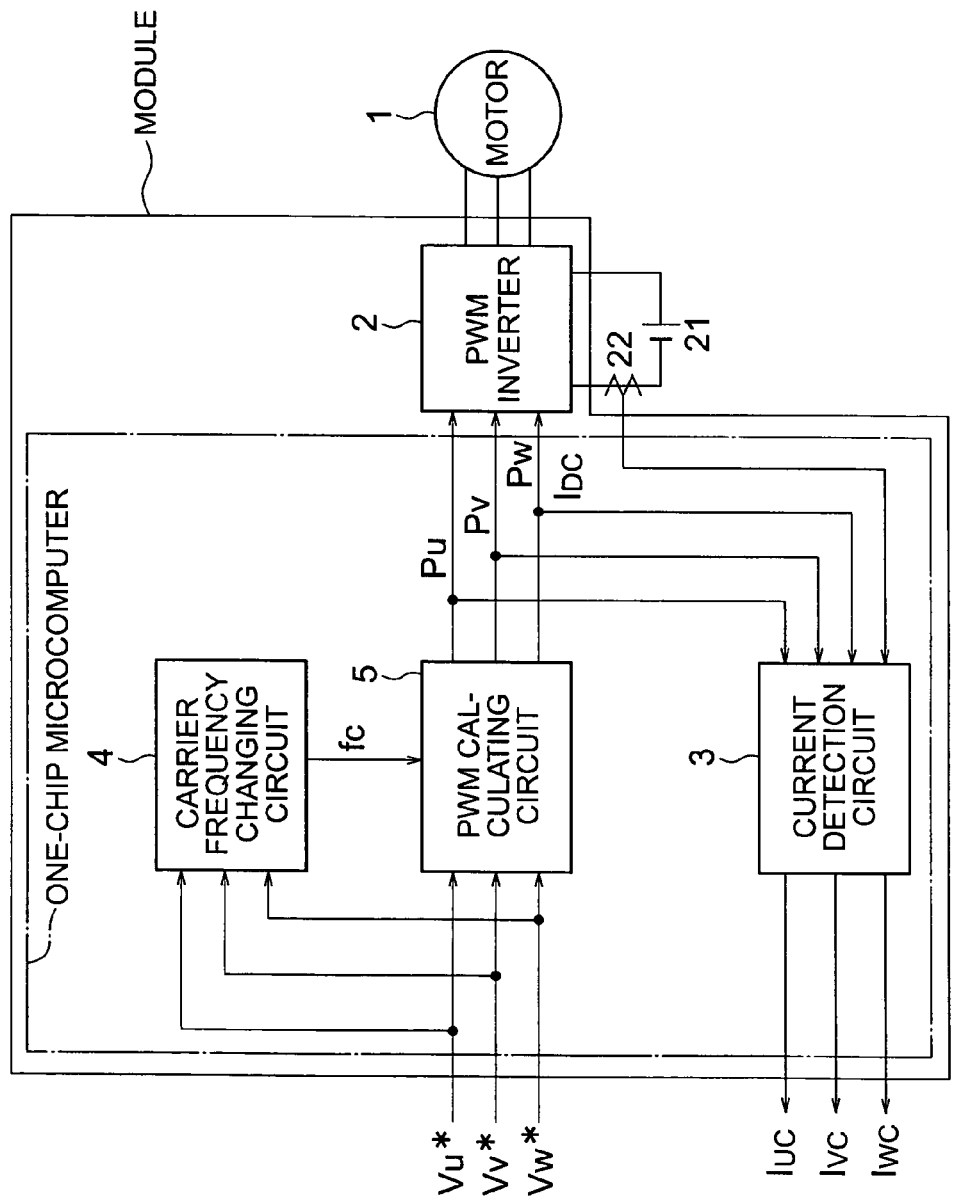
FIG. 9 shows an arrangement of a module to which the embodiment of FIG. 1 is applied.

Description will be made in connection with an embodiment wherein this invention is applied to a module by referring to FIG. 9. This embodiment corresponds to a modification of the first embodiment. In the modification, a current detection circuit 3, a carrier frequency changing circuit 4, and a PWM calculating circuit 5 make up part of a one-chip microcomputer. Further, the ones-chip microcomputer and the PWM inverter 2 are arranged to be accommodated within one module mounted on the same substrate. The word "module" as used herein defines a "standardized constituent unit" which is made of separatable hardware and/or software components. The module is provided preferably on the same substrate from the viewpoint of its manufacturing. However, the module is not limited only to the provision on the substrate, the module may be provided on a plurality of circuit boards housed within the same body. Even in other embodiments, the module can be provided in a manner similar to the above.

As has been described in the foregoing, the embodiments of this invention have an advantage that, when detection is impossible due to narrow PWM pulse difference width, even such another objective as to depend on the estimation based on past data, first-order lag element, etc. can be accurately detected. In particular, when the carrier frequency is reduced to 1/10, the objective can be accurately detected in reverse proportion to the reduction of the carrier frequency so that the PWM pulse difference width becomes 10 times.

In accordance with this invention, there are provided an apparatus and method for controlling an AC motor and a module, by accurately detecting 3 phase motor currents from a DC input current.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An apparatus for controlling an AC motor comprising:
a three-phase PWM inverter which receives a DC current, outputs a three-phase AC current and drives the AC motor acting as a load;
a current detection unit estimating a current of the AC motor from the DC current inputted to said three-phase PWM inverter; and
PWM calculation unit inputting a three-phase voltage command value and a carrier frequency and outputting a drive signal to a switching element of said three-phase PWM inverter,
said control apparatus further comprising a carrier frequency changing unit inputting the three-phase voltage command value and outputting the carrier frequency,
wherein, when a difference between a pulse width of PWM pulse signals having an intermediate phase of the three-phase voltage command value and a pulse width of the PWM pulse signals having a maximum phase thereof, or a difference between the pulse width of the PWM pulse signals having the intermediate phase and a pulse width of the PWM pulse signals having a minimum phase thereof is shorter than a predetermined current detection minimum time, the carrier frequency is reduced by said carrier frequency changing unit.

2. An apparatus as set forth in claim 1, wherein the AC motor comprises a permanent magnet synchronous motor.

3. An apparatus as set forth in claim 1, wherein said current detection minimum time Tpwm min is expressed by the following equation:

$$Tpwm\ min = Td + Trig + Tsml + Tpow\ on - Tpow\ off \quad (1)$$

where Td indicates a dead time, Trig indicates a current ringing time, Tsml indicates a current sampling time of said current detection unit, Tpow on indicates a power-on delay time of said switching element, and Tpow off indicates a power-off delay time of said switching element.

4. An apparatus as set forth in claim 1, further comprising a lower limit carrier frequency calculating unit inputting the three-phase voltage command value and outputting a lower limit carrier frequency, said carrier frequency changing unit inputting the lower limit carrier frequency and outputting the carrier frequency.

5. An apparatus as set forth in claim 4, wherein a lower limit value of the carrier frequency is reduced and outputted according to reduction of a voltage modulation ratio of the three-phase voltage command value.

6. A module including an apparatus for controlling an AC motor, said apparatus comprising:
a three-phase PWM inverter for receiving a DC current, outputting a three-phase AC current and driving the AC motor acting as a load; and
a current detection unit estimating a current of the AC motor from the DC current inputted to said three-phase PWM inverter; and
PWM calculation unit inputting a three-phase voltage command value and a carrier frequency, and outputting a drive signal to a switching element of said three-phase PWM inverter,
said control apparatus further comprising a carrier frequency changing unit inputting the three-phase voltage command value and outputting the carrier frequency,
wherein, when a difference between a pulse width of PWM pulse signals having an intermediate phase of the three-phase voltage command value and a pulse width of the PWM pulse signals having a maximum phase thereof, or a difference between the pulse width of the PWM pulse signals having the intermediate phase and a pulse width of the PWM pulse signals having a minimum phase thereof is shorter than a predetermined current detection minimum time, the carrier frequency is reduced by said carrier frequency changing unit.

* * * * *